US011921560B2

(12) United States Patent
Kinsley et al.

(10) Patent No.: US 11,921,560 B2
(45) Date of Patent: **\*Mar. 5, 2024**

(54) MEMORY DEVICE POWER MANAGEMENT

(71) Applicant: Micron Technology, Inc., Boise, ID (US)

(72) Inventors: Thomas H. Kinsley, Boise, ID (US); Baekkyu Choi, San Jose, CA (US); Fuad Badrieh, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,149

(22) Filed: Dec. 19, 2022

(65) Prior Publication Data

US 2023/0118893 A1    Apr. 20, 2023

Related U.S. Application Data

(63) Continuation of application No. 17/110,140, filed on Dec. 2, 2020, now Pat. No. 11,561,597.

(51) Int. Cl.
*G06F 1/32* (2019.01)
*G06F 1/3225* (2019.01)

(52) U.S. Cl.
CPC .................. *G06F 1/3225* (2013.01)

(58) Field of Classification Search
CPC .................................................. G06F 1/3225
See application file for complete search history.

(56) References Cited

U.S. PATENT DOCUMENTS

| | | |
|---|---|---|
| 6,434,044 B1 | 8/2002 | Gongwer et al. |
| 8,929,169 B1 | 1/2015 | Yang et al. |
| 2006/0174140 A1 | 8/2006 | Harris et al. |
| 2013/0141991 A1 | 6/2013 | Solvin et al. |
| 2013/0254575 A1 | 9/2013 | Huang |
| 2013/0301372 A1 | 11/2013 | Park et al. |
| 2015/0003181 A1 | 1/2015 | Droege et al. |
| 2015/0036446 A1 | 2/2015 | Kenkare et al. |
| 2015/0058643 A1 | 2/2015 | Lai |
| 2017/0069601 A1 | 3/2017 | Park |
| 2019/0250853 A1 | 8/2019 | Arbel et al. |

(Continued)

FOREIGN PATENT DOCUMENTS

KR    10-2018-0074138 A    7/2018

OTHER PUBLICATIONS

Wikipedia, Power management integrated circuit, pp. 1-3, retrieved from the internet at <https://web.archive.org/web/20191214001747/https://en.wikipedia.org/wiki/Power_management_integrated_circuit> (Year: 2019).*

(Continued)

*Primary Examiner* — Stefan Stoynov
(74) *Attorney, Agent, or Firm* — Holland & Hart LLP

(57) ABSTRACT

Methods, systems, and devices for memory device power management are described. An apparatus may include a memory die that includes a power management circuit. The power management circuit may provide a voltage for operating one or more memory dies of the apparatus based on a supply voltage received by the memory die. The second voltage may be distributed to the one or more other memory dies in the apparatus.

20 Claims, 6 Drawing Sheets

(56) References Cited

U.S. PATENT DOCUMENTS

2020/0152255 A1   5/2020   Badrieh et al.

OTHER PUBLICATIONS

"International Search Report and Written Opinion of the International Searching Authority," issued in connection with Int'l Appl. No. PCT/US21/72579, dated Mar. 17, 2022 (11 pages).
"International Search Report and Written Opinion of the International Searching Authority," issued in connection with Int'l Appl. No. PCT/US21/72580, dated Mar. 15, 2022 (9 pages).

* cited by examiner

MEMORY DEVICE POWER MANAGEMENT

CROSS REFERENCE

The present Application for Patent is a continuation of U.S. patent application Ser. No. 17/110,140 by Kinsley et al., entitled "MEMORY DEVICE POWER MANAGEMENT," filed Dec. 2, 2020, assigned to the assignee hereof, and is expressly incorporated by reference in its entirety herein.

FIELD OF TECHNOLOGY

The following relates generally to one or more systems for memory and more specifically to memory device power management.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

A memory device may include multiple memory dies that include memory arrays for storing information. The memory dies may use different voltage levels to operate. For example, the memory dies may use a first voltage level to operate the memory arrays, a second voltage level to operate input/output (I/O) circuitry, and a third voltage level to operate other components of the memory dies. To provide the different voltage levels each memory die may include a power management circuit, such as a power management integrated circuit (PMIC), for each voltage level. For example, each memory die may include a first power management circuit that provides the first voltage level, a second power management circuit that provides the second voltage level, and a third power management circuit that provides the third voltage level. But including multiple power management circuits on each memory die may be inefficient and may take up excess room on the memory dies, among other disadvantages.

According to the techniques described herein, a subset of memory dies ("provider memory dies") in a memory device may be configured to provide different voltages to other memory dies. Because the provider memory dies supply voltages to the other memory dies ("recipient memory dies"), the other memory dies may omit power management circuits that would otherwise be included to generate the supplied voltages. Thus, the techniques described herein may allow for recipient memory dies that are smaller in size or more of the die area is used for memory cells and the storage capacity is larger, among other advantages.

Features of the disclosure are initially described in the context of a system as described with reference to FIG. 1. Features of the disclosure are then described in the context of memory devices as described with reference to FIGS. 2-4. Features of the disclosure are further illustrated by and described with reference to an apparatus diagram and a flowchart that relate to memory device power management as described with reference to FIGS. 5 and 6.

Figure 1:
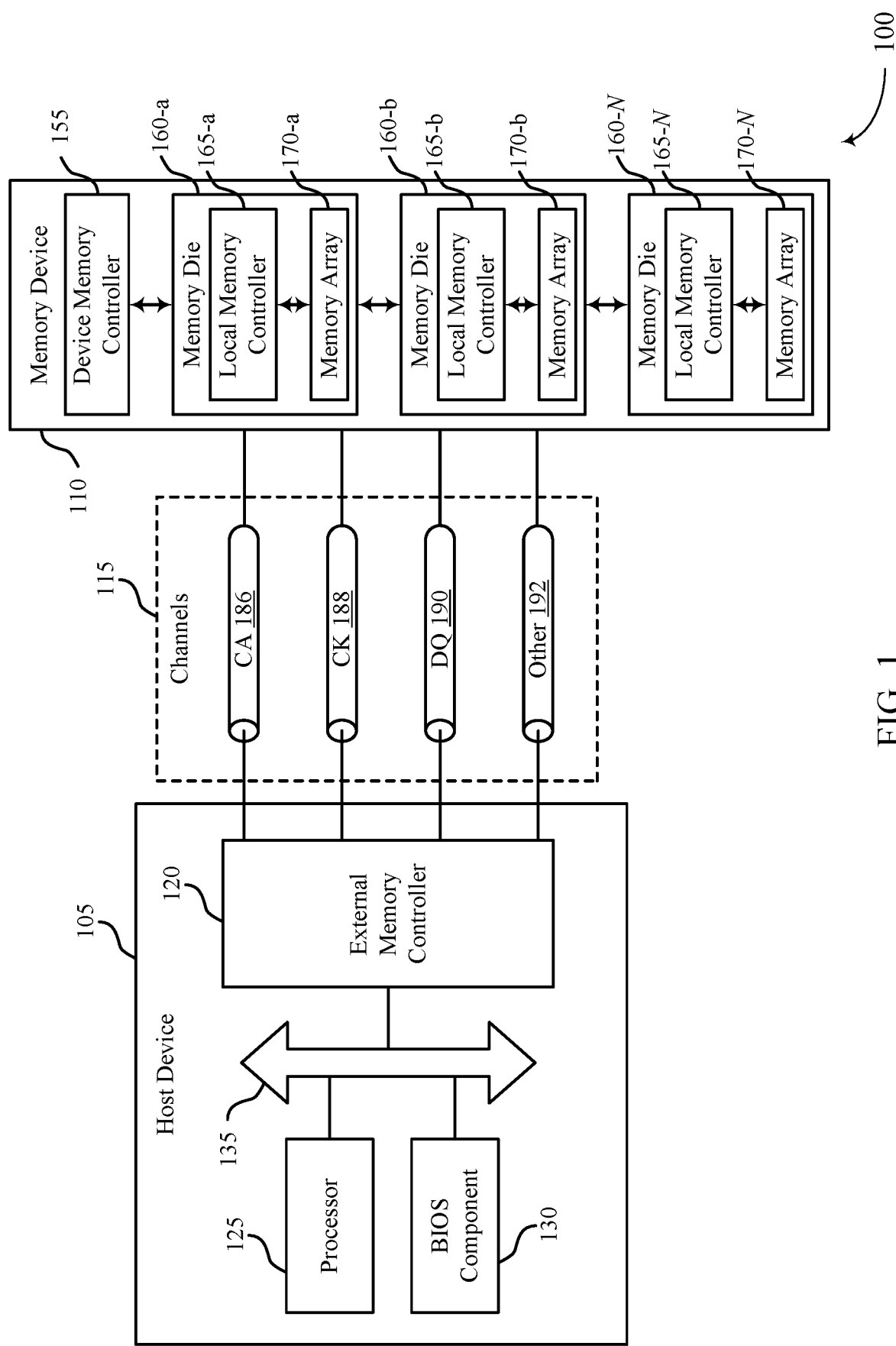
FIG. 1 illustrates an example of a system that supports memory device power management in accordance with examples as disclosed herein.

FIG. 1 illustrates an example of a system 100 that supports memory device power management in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of ROM, flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The memory die 160 may be an example of a two-dimensional (2D) array of memory cells or may be an example of a three-dimensional (3D) array of memory cells. A 2D memory die 160 may include a single memory array 170. A 3D memory die 160 may include two or more memory arrays 170, which may be stacked on top of one another or positioned next to one another (e.g., relative to a substrate). In some examples, memory arrays 170 in a 3D memory die 160 may be referred to as decks, levels, layers, or dies. A 3D memory dies 160 may include any quantity of stacked memory arrays 170 (e.g., two high, three high, four high, five high, six high, seven high, eight high). In some 3D memory dies 160, different decks may share at least one common access line such that some decks may share one or more of a word line, a digit line, or a plate line.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

The memory dies 160 included in the memory device 110 may use different voltages levels to operate ("operating voltages"). For example, the memory dies 160 may use a first voltage level to operate the memory array(s) 170, a second voltage level to operate the local memory controllers 165, and a third voltage to operate I/O circuitry, among other voltages. In other examples, one or more voltages levels may be used to operate the memory array(s) 170, or one or more voltage levels may be used to operate the local memory controllers 165, or a one or more voltage levels may be used to operate I/O circuitry, or any combination thereof. Each memory die 160 may include one or more power management circuits that provide the operating voltage(s) for that memory die 160. Thus, each memory die 160 may include a set of power management circuits. But including a set of power management circuits on each memory die 160 may consume space on the memory die 160, resulting in memory dies 160 with increased sizes or reduced storage capacities due to having fewer memory cells for a given die area, among other disadvantages.

According to the techniques described herein, a set of the memory dies 160 ("provider memory dies) may include power management circuits that are configured to supply operating voltages to other memory dies 160 ("recipient memory dies") so that the other memory dies 160 can have fewer power management circuits, smaller power management circuits, or no power management circuits. Thus, the size of the recipient memory dies 160 may be reduced (e.g., by omitting the sections of the memory dies that previously occupied by the power management circuitry) or the capacities of the recipient memory dies 160 may be increased (e.g., by using the sections of the memory dies previously occupied by power management circuits for memory cells), among other advantages. In some cases, a provider memory die may also be a considered a recipient memory die if another provider memory die supplies an operating voltage to that provider memory die.

Figure 2:
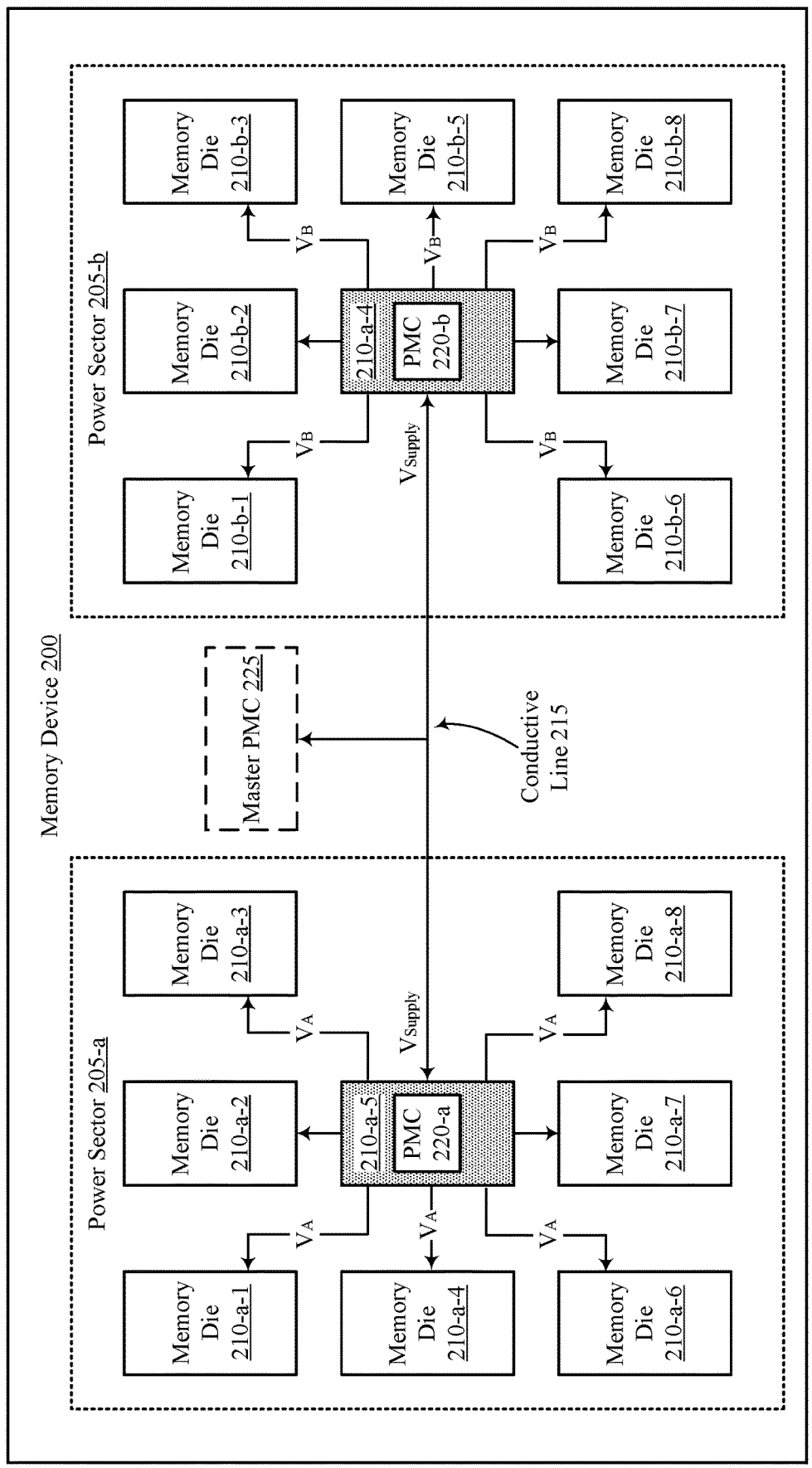
FIG. 2 illustrates an example of a memory device that supports power management in accordance with examples as disclosed herein.

FIG. 2 illustrates an example of a memory device 200 that supports power management in accordance with examples as disclosed herein. The memory device 200 may be an example of a system 100 or a memory device 110 as described with reference to FIG. 1. However, the techniques described herein are not limited to the devices described herein and may be implemented by any device with multiple memory dies. In some examples, the memory device 200 may be referred to as a memory module and may be included in a memory system 100 or a memory device 110 as described with reference to FIG. 1, or another type of device. For example, the memory device 200 may be a dual in-line memory module (DIMM).

The memory device 200 may be divided into power sectors 205 which may define groups of recipient memory dies 210 that are powered by a subset (e.g., one or more) of provider memory dies 210. For example, the memory dies 210-$a$ in power sector 205-$a$ may perform various operations or power various components using an operating voltage (e.g., $V_A$) provided by provider memory die 210-$a$-5. And the memory dies 210-$b$ in power sector 205-$b$ may various operations or power various components operate using an operating voltage (e.g., $V_B$) provided by provider memory die 210-$b$-5. In some cases, the operating voltages $V_A$ and $V_B$ may have the same voltage level or different voltage levels (e.g., the voltages $V_A$ and $V_B$ may have the same amplitude or different amplitudes). For differentiation purposes provider memory dies are shaded in FIGS. 2 through 4.

Using a subset of provider memory dies 210 to supply operating voltages to the memory dies 210 in a power sector 205 may allow the recipient memory dies 210 to have fewer power management circuits (PMCs), smaller power management circuits, or no power management circuits, which in turn may reduce the size of the memory dies 210 and/or increase the capacity of the memory dies 210 relative to memory dies in devices that use other power management schemes. Additionally, using different subsets of provider memory dies 210 to power different power sectors 205 may isolate power issues in one power sector 205 from other power sectors 205 (e.g., power sector 205-$b$ may be shielded from power issues in power sector 205-$a$), which may improve system performance. Further, the use of power sectors may enable localized power management as described in more detail below. In some cases, a power management circuit may be referred to as a power management integrated circuit (PMIC).

The operating voltage provided by a provider memory die 210 may be based on a supply voltage (e.g., $V_{Supply}$) received by that provider memory die 210. For example, provider memory die 210-$a$-5 may produce the operating voltage $V_A$ for the memory dies in power sector 205-$a$ (e.g., memory die 210-$a$-1 through 210-$a$-8) based on the supply voltage $V_{Supply}$ from the conductive line 215. And provider memory die 210-b-5 may produce the operating voltage $V_B$ for the memory dies in power sector 205-b (e.g., memory die 210-b-1 through memory die 210-b-8) based on the supply voltage $V_{Supply}$ from the conductive line 215. In some cases, the operating voltages $V_A$ and $V_B$ may have the same voltage level and/or may be lower than the voltage $V_{Supply}$ supplied by the conductive line 215.

The production of an operating voltage may be performed by a power management circuit 220 on a provider memory die 210. For example, the power management circuit 220-a may produce the operating voltage $V_A$, which may be used to operate the provider memory die 210-a-5 as well as the other memory dies in power sector 205-a. And the power management circuit 220-b may produce the operating voltage $V_B$, which may be used to operate provider memory die 210-b-5 as well as the other memory dies in power sector 205-b. Producing an operating voltage may include changing (e.g., reducing) a received voltage (e.g., $V_{Supply}$) from one level to another and/or regulating (e.g., smoothing, maintaining within a range of a threshold) the received voltage. For example, a power management circuit 220 may use a supply voltage of x volts (V) to generate an operating voltage of y V that has reduced fluctuations. Thus, a power management circuit 220 may generate an operating voltage based on a supply voltage that is higher than the operating voltage. Put another way, a power management circuit 220 may produce an operating voltage by converting a raw input voltage to a desired level.

Each provider memory die 210 may be coupled with a conductive line 215 (or "supply rail") that is configured to convey the voltage $V_{Supply}$. As noted, the voltage $V_{Supply}$ may be higher than the operating voltages of the memory dies; however, in some examples the voltage $V_{Supply}$ may be lower than or the same as the operating voltages. In some examples, the conductive line 215 may be supplied with current from a master power management circuit 225, which may regulate voltage (e.g., from a power source, such as a battery) that is too high for the provide memory die 210 to handle. Thus, the master power management circuit 225 may reduce and/or smooth the voltage from the power source before outputting the regulated voltage to the provider memory dies 210. Alternatively, the conductive line 215 may be supplied with current directly from the power source (provided the memory die 210 is configured to handle the unregulated voltage). In some cases, the master power management circuit 225-c may be disposed on the memory device 200 or may be external to the memory device 200. Further, the conductive line 215 may be positioned at the card edge of the memory device 200 (e.g., the conductive line 215 may be positioned within a threshold distance of the edge of the substrate upon which the memory dies 210 are disposed).

The operating voltage produced by a power management circuit 220 may be used by that provider memory die 210 as well as output or supplied to recipient memory dies 210 in the relevant power sector 205. Thus, the memory dies 210 in a power sector 205 may operate using an operating voltage generated by a provider memory die 210 in that power sector. Use of an operating voltage may include applying that operating voltage to one or more components of a memory die 210 (e.g., to activate, deactivate, drive, bias, and/or power the one or more components). Although shown with a single provider memory die 210 per power sector 205, in some cases a power sector 205 may include additional power management circuits (e.g., on the same provider memory dies 210 or on additional provider memory dies) that supply additional operating voltages to the memory dies 210 in that power sector 205.

Although the recipient memory dies are shown coupled with the provider memory dies 210, in some cases the recipient memory dies 210 may further be coupled with the power management circuit 220 in each provider memory die 210. For example, each recipient memory die 210 may be coupled with one or more permanent or activatable conductive paths that terminate at the power management circuit 220. Thus, each recipient memory die 210 may be configured to receive an operating voltage from one or more provider memory dies 210 in a power sector 205.

As noted, dividing the memory dies 210 into power sectors 205 powered by a respective provider memory die 210 may allow for local and independent power management, which may improve system performance. For example, power sector 205-a may be isolated from power issues (e.g., power surges) in power sector 205-b, and vice versa. Additionally, each power sector 205 may be managed based on the characteristics of that power sector 205, which may save power. For example, when the memory dies 210 in power sector 205-a reach a threshold level of activity, the provider memory die 210-a-5 may power down power sector 205-a by ceasing to supply the operating voltage $V_A$ to the memory dies 210-a. Thus, the provider power memory dies 210 may function independently of each other.

Although the recipient memory dies 210 are shown without power management circuits, in some cases a recipient memory die 210 may include one or more power management circuits that further refine the operating voltage(s) received from provider memory die(s) 210 to more precise values or that produce intermediate operating voltages based on the operating voltage(s) received from the provider memory die(s) 210. Additionally, the techniques described herein can be implemented for different configurations of the memory device 200 and therefore are not limited to the illustrated configuration.

Figure 3:
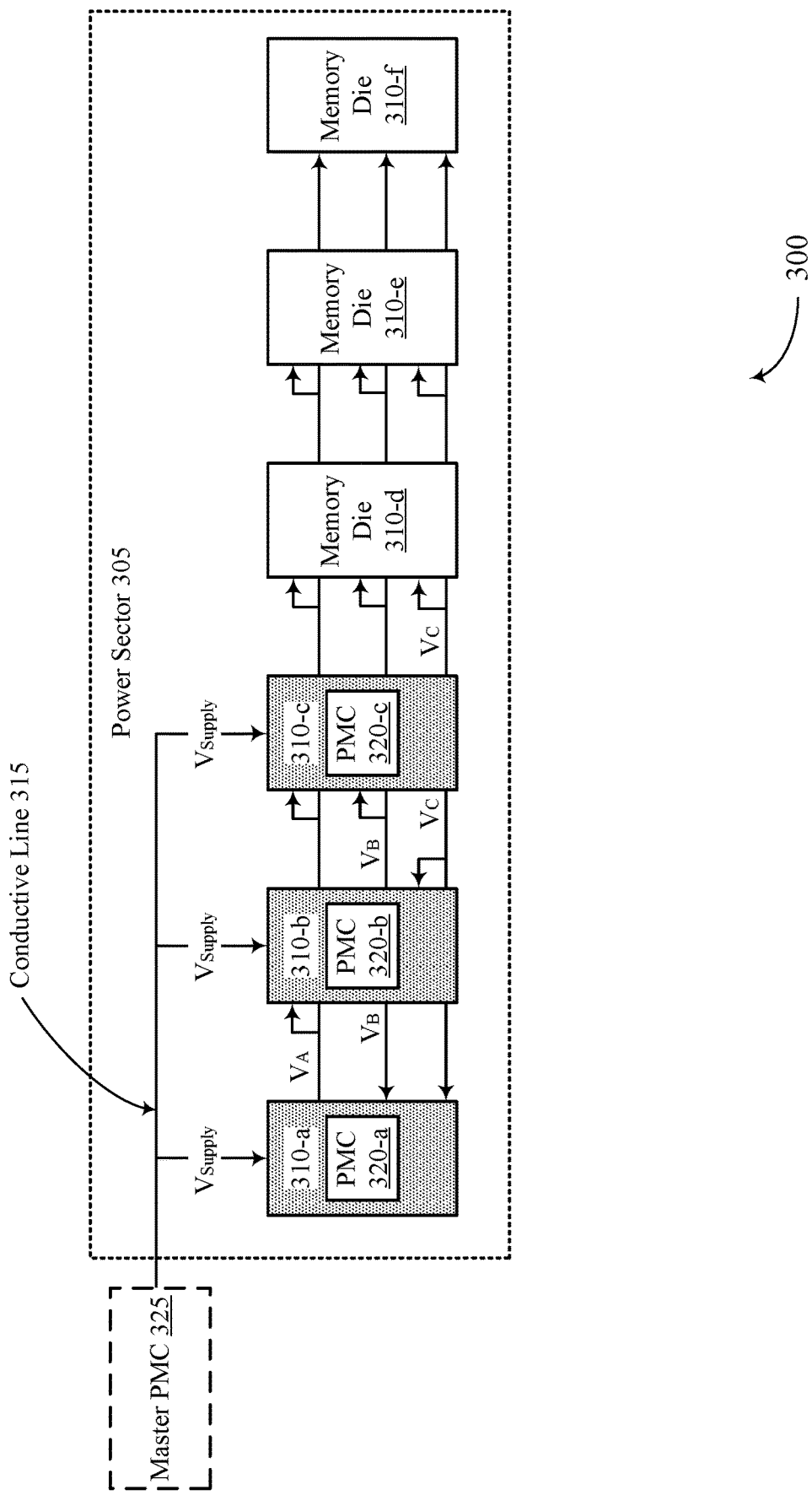
FIG. 3 illustrates an example of a memory device that supports power management in accordance with examples as disclosed herein.

FIG. 3 illustrates an example of a memory device 300 that supports power management in accordance with examples as disclosed herein. The memory device 300 may be an example of a system 100 or a memory device 110 as described with reference to FIG. 1, or a memory device 200 as described with reference to FIG. 2. However, the techniques described herein are not limited to the devices described herein and may be implemented by any device with multiple memory dies. In some examples, the memory device 300 may be referred to as a memory module (e.g., the memory device 300 may be a DIMM) and may be included in a memory system 100 or a memory device 110 as described with reference to FIG. 1, or a memory device 200 as described with reference to FIG. 2, or another type of device.

The memory device 300 may include a power sector 305, which may be an example of a power sector 205. Thus, the power sector 305 may define groups of memory dies 310 that are powered by a shared set of provider memory dies 310. Using a set of provider memory dies 310 to supply operating voltages to the memory dies 310 in a sector may allow the recipient memory dies 310 to have fewer power management circuits, smaller power management circuits, or no power management circuits, which in turn may reduce the size of the memory dies 310 and/or increase the capacity of the memory dies 310 relative to memory dies in devices that use other power management schemes.

The memory device 300 may include a master power management circuit 325, which may produce a voltage (e.g., $V_{Supply}$) that is supplied to the power management circuits 320 via the conductive line 315. Alternatively, the voltage $V_{Supply}$ may be sourced from a component other than the master power management circuit 325, such as a battery. Regardless of the source of voltage $V_{Supply}$, the conductive line 315 may be configured to convey the voltage $V_{Supply}$ to the power management circuits 320 (e.g., the conductive line 315 may be configured to convey a current at the voltage $V_{Supply}$). The power management circuits 320 may be coupled with the conductive line 315 and may be configured to receive the voltage $V_{Supply}$ via one or more permanent or activatable conductive paths that couple the power management circuits 320 with the conductive line 315. Thus, the voltage $V_{Supply}$ may be received at each power management circuit 320 on each provider memory die 310.

The power management circuits 320 may produce different operating voltages for the power sector 305 based on the voltage $V_{Supply}$. For example, the power management circuit 320-a on provider memory die 310-a may produce an operating voltage $V_A$ that is used to operate provider memory die 310-a and that is distributed to the other memory dies 310 in power sector 305. Similarly, the power management circuit 320-b on provider memory die 310-b may produce an operating voltage $V_B$ that is used to operate provider memory die 310-b and that is distributed to the other memory dies 310 in power sector 305. And the power management circuit 320-c on provider memory die 310-c may produce an operating voltage $V_C$ that is used to operate provider memory die 310-c and that is distributed to the other memory dies 310 in power sector 305. The memory dies 310 may use the different operating voltages to perform different functions such as operating memory arrays, I/O circuitry, controllers, and other components on or coupled with the memory dies 310.

Thus, the memory dies 310 in power sector 305 may operate using the operating voltages $V_A$, $V_B$, and $V_C$ produced by the power management circuits 320 on provider memory dies 310-a, 310-b, and 310-c, respectively. Because the operating voltages are produced by power management circuits 320 on a subset of the memory dies 310, the other memory dies in power sector 305 may omit power management circuits that would otherwise be included to produce those operating voltages. Thus, the sizes of the memory dies 310 may be smaller and/or the capacities of the memory dies 310 may be larger relative to other power management techniques.

To facilitate the transfer of the operating voltages between the memory dies 310 the memory device 300 may include a network of permanent or activatable conductive paths that couple the power management circuits 320 on the provider memory dies 310 with the other memory dies 310 in the power sector 305. For example, the power management circuit 320-a may be coupled with each of the memory dies 310-b through 310-f via one or more respective conductive paths. A conductive path may include a series of conductive traces, passive components, and/or activatable components that are collectively configured to convey current from one terminating device (e.g., a power management circuit 320) to another terminating device (e.g., a memory die 310).

Broadening language and disclaimers discussed with reference to FIG. 2 may also apply to FIG. 3. Additionally, aspects of the techniques described with reference to FIG. 3 can be used in conjunction with aspects of the techniques described with reference to FIG. 2.

Figure 4:
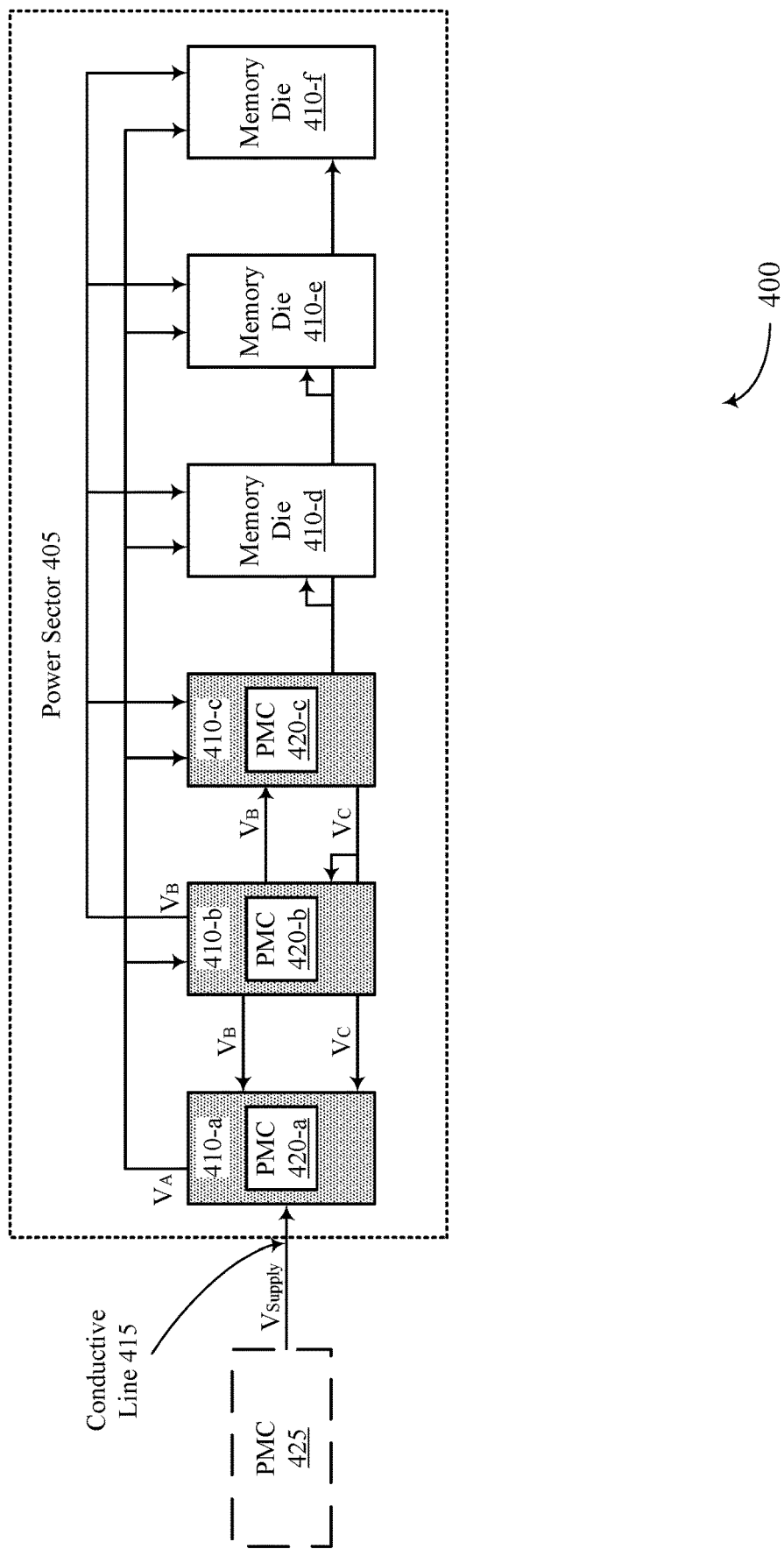
FIG. 4 illustrates an example of a memory device that supports power management in accordance with examples as disclosed herein.

FIG. 4 illustrates an example of a memory device 400 that supports power management in accordance with examples as disclosed herein. The memory device 400 may be an example of a system 100 or a memory device 110 as described with reference to FIG. 1, a memory device 200 as described with reference to FIG. 2, or a memory device 300 as described with reference to FIG. 3. However, the techniques described herein are not limited to the devices described herein and may be implemented by any device with multiple memory dies. In some examples, the memory device 400 may be referred to as a memory module (e.g., the memory device 400 may be a DIMM) and may be included in a memory system 100 or a memory device 110 as described with reference to FIG. 1, a memory device 200 as described with reference to FIG. 2, a memory device 300 described with reference to FIG. 3, or another type of device.

Unlike the power management circuits 320 in memory device 300, only one of the power management circuits 420 may use the voltage $V_{Supply}$ as the basis for producing an operating voltage. For example, only power management circuit 420-a may use $V_{Supply}$ as the input voltage for producing operating voltage $V_A$. The other power management circuits 420 may use the operating voltages from other power management circuits 420 as the input voltages for producing additional operating voltages. Such a technique may allow for at least some of the power management circuits 420 (e.g., power management circuit 420-b and power management circuit 420-c) to be smaller in size or simpler compared to the power management circuits 320. Additionally, the power management circuits 420-b and 420-c may dissipate less heat than their counterparts described with reference to FIG. 3 because the input voltages (e.g., $V_A$, $V_B$) regulated by the power management circuits 420-b and 420-c are lower than voltage $V_{Supply}$.

Similar to the memory device 300, the memory device 400 may include a master power management circuit 425 that provides voltage $V_{Supply}$ via the conductive line 415. However, the master power management circuit 425 may provide voltage $V_{Supply}$ only to power management circuit 420-a (as opposed to providing the voltage $V_{Supply}$ to each of the power management circuits 420). The power management circuit 420-a may produce operating voltage $V_A$ from the voltage $V_{Supply}$ and distribute operating voltage $V_A$ to the other memory dies 410 in power sector 405. The power management circuit 420-a may also provide the operating voltage $V_A$ to power management circuit 420-b, which may use the operating voltage $V_A$ to produce operating voltage $V_B$. The power management circuit 420-b may distribute the operating voltage $V_B$ to the other memory dies 410 in power sector 405 and to power management circuit 420-c, which may use the operating voltage $V_B$ to generate operating voltage $V_C$. The power management circuit 420-c may distribute the operating voltage $V_C$ to the other memory dies 410. Thus, the operating voltages $V_A$, $V_B$, and $V_C$ may be distributed throughout the power sector 405. In some examples, the operating voltages $V_A$, $V_B$, and $V_C$ may have different amplitudes or magnitudes. For example, $V_A$ may be a higher voltage than $V_B$, which in turn may be a higher voltage than $V_C$.

Although shown sourced from the master power management circuit 425, the voltage $V_{Supply}$ may be sourced from a component other than the master power management circuit 425, such as a battery. Regardless of the source of voltage $V_{Supply}$, the conductive line 415 may be configured to convey the voltage $V_{Supply}$ to power management circuit 420-a (e.g., the conductive line 415 may be configured to convey a current at the voltage $V_{Supply}$). The power management circuit 420-a may be coupled with the conductive line 415 and may be configured to receive the voltage $V_{Supply}$ via a permanent or activatable conductive path that couple power management circuit 420-a with the conductive line 415. However, the other power management circuits (e.g., power management circuit 420-b and power management circuit 420-c) may be isolated from the conductive line 415 (and thus isolated from the master power management circuit 425).

Broadening language and disclaimers described with reference to FIG. 2 may also apply to FIG. 4. Additionally, aspects of the techniques described with reference to FIG. 4 can be used in conjunction with aspects of the techniques described with reference to FIGS. 2 and 3.

Figure 5:
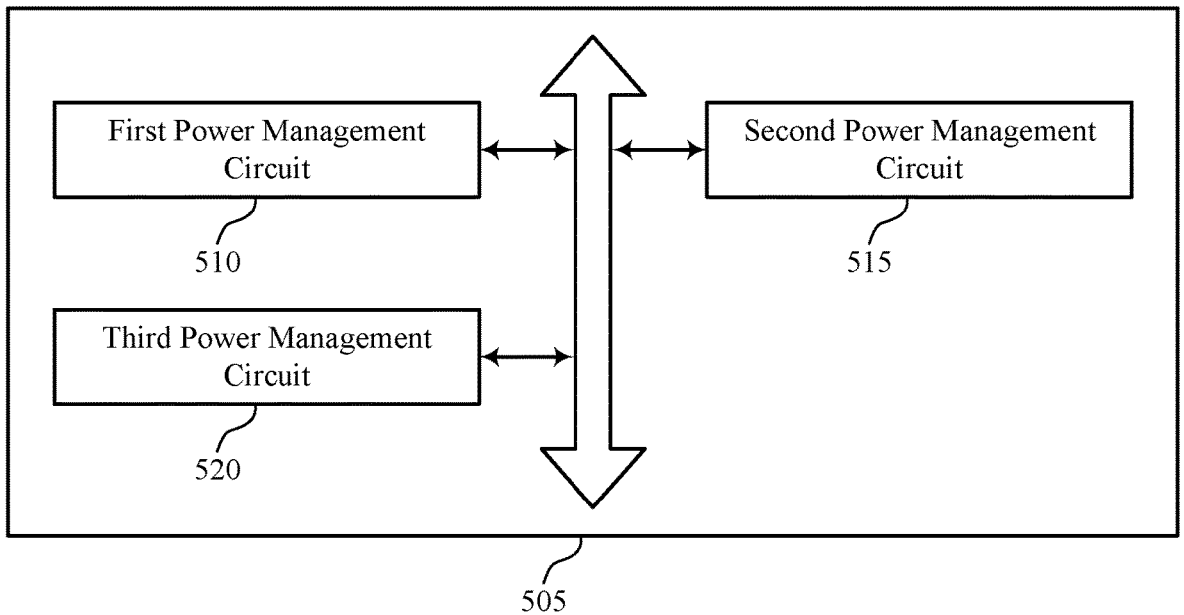
FIG. 5 shows a block diagram of a memory device that supports power management in accordance with examples as disclosed herein.

FIG. 5 shows a block diagram 500 of a memory device 505 that supports memory device power management in accordance with examples as disclosed herein. The memory device 505 may be an example of aspects of a memory device as described with reference to FIGS. 1 through 4. The memory device 505 may include a first power management circuit 510, a second power management circuit 515, and a third power management circuit 520. Each of these modules may communicate, directly or indirectly, with one another (e.g., via one or more buses). The first power management circuit 510, the second power management circuit 515, and the third power management circuit 520 may be examples of PMICs.

The first power management circuit may be on a first memory die and 510 may receive a first voltage for powering one or more components. In some examples, the first power management circuit 510 may provide a second voltage for operating the first memory die and a second memory die based on the first voltage. In some examples, the first power management circuit 510 may provide the second voltage to the second memory die, the second voltage for operating the second memory die. In some examples, the first power management circuit 510 may provide the second voltage to a set of memory dies, the second voltage for operating the set of memory dies. In some examples, providing the third voltage includes regulating the first voltage from a first level to second level.

The second power management circuit 515 may be on a second memory die and may provide a third voltage for operating the first memory die and the second memory die. In some examples, the second power management circuit 515 may receive the first voltage at the second power management circuit, where the third voltage is based on the first voltage. In some examples, the second power management circuit 515 may receive the second voltage, where the third voltage is based on the second voltage. In some examples, the second power management circuit 515 may provide the third voltage to the first memory die. In some examples, the second power management circuit 515 may provide the third voltage to the set of memory dies, the third voltage for operating the set of memory dies. In some examples, the second power management circuit 515 may regulate the second voltage from the second level to a third level. In some cases, the second voltage is lower than the first voltage and the third voltage is lower than the second voltage.

The third power management circuit 520 may be on a third memory die and may provide a fourth voltage for operating the third memory die and at least one of the first memory die and the second memory die. In some examples, the third power management circuit 520 may receive the second voltage and the third voltage at the third memory die. In some examples, the third power management circuit 520 may operate the third memory die based on the second voltage and the third voltage. In some examples, the third power management circuit 520 may receive the first voltage at the third power management circuit, where the fourth voltage is based on the first voltage. In some examples, the third power management circuit 520 may receive the third voltage at the third power management circuit, where the fourth voltage is based on the third voltage.

Figure 6:
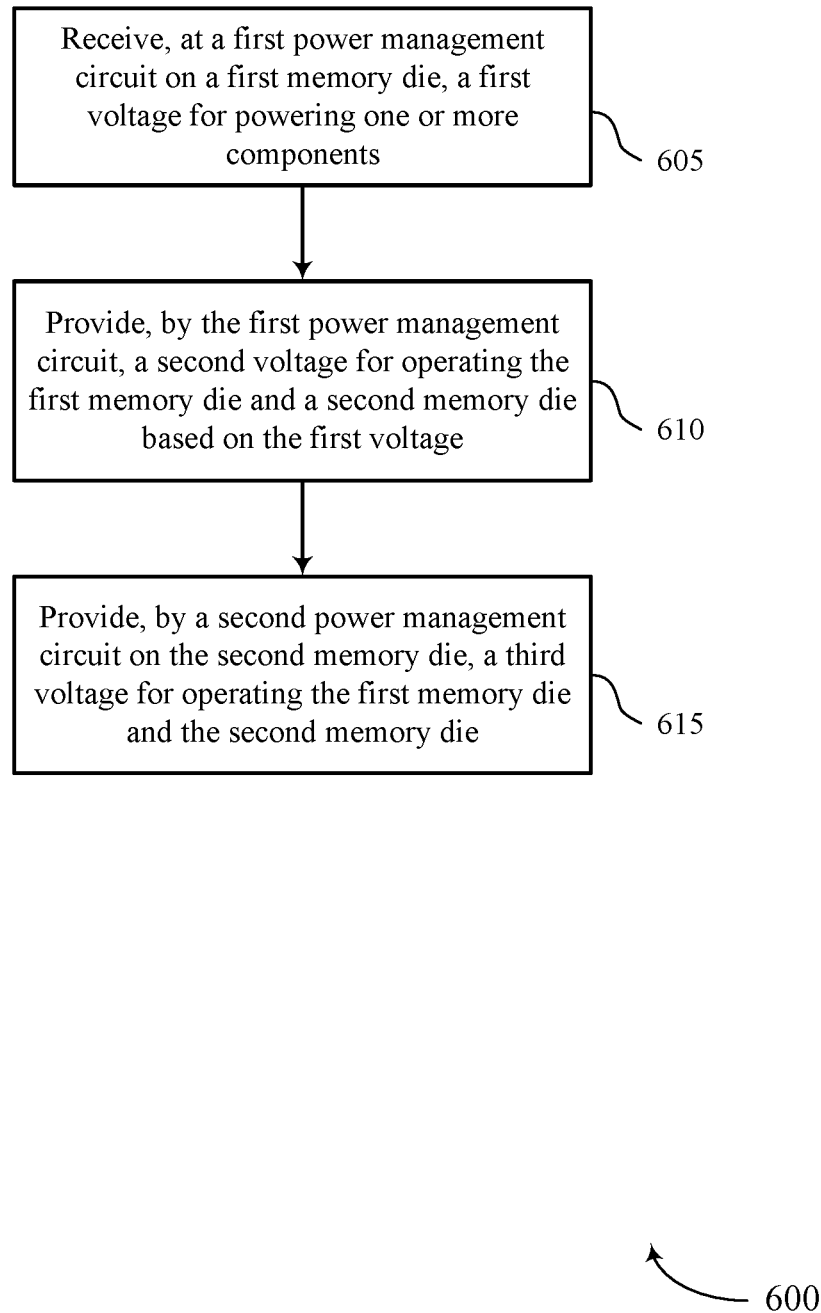
FIG. 6 shows a flowchart illustrating a method or methods that support memory device power management in accordance with examples as disclosed herein.

FIG. 6 shows a flowchart illustrating a method or methods 600 that supports memory device power management in accordance with examples as disclosed herein. The operations of method 600 may be implemented by a memory device or its components as described with reference to FIGS. 2 through 4. For example, the operations of method 600 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 605, the method may include receiving at a first power management circuit on a first memory die, a first voltage for powering one or more components. The operations of 605 may be performed according to the methods described with reference to FIGS. 2 through 4. In some examples, aspects of the operations of 605 may be performed by a first power management circuit as described with reference to FIG. 5.

At 610, the method may include providing, by the first power management circuit, a second voltage for operating the first memory die and a second memory die based on the first voltage. The operations of 610 may be performed according to the methods described with reference to FIGS. 2 through 4. In some examples, aspects of the operations of 610 may be performed by a first power management circuit as described with reference to FIG. 5.

At 615, the method may include providing, by a second power management circuit on the second memory die, a third voltage for operating the first memory die and the second memory die. The operations of 615 may be performed according to the methods described with reference to FIGS. 2 through 4. In some examples, aspects of the operations of 615 may be performed by a second power management circuit as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for receiving, at a first power management circuit on a first memory die, a first voltage for powering one or more components, providing, by the first power management circuit, a second voltage for operating the first memory die and a second memory die based on the first voltage, and providing, by a second power management circuit on the second memory die, a third voltage for operating the first memory die and the second memory die.

Some examples of the method 600 and the apparatus described herein may further include operations, features, means, or instructions for receiving the first voltage at the second power management circuit, where the third voltage may be based on the first voltage.

Some examples of the method 600 and the apparatus described herein may further include operations, features, means, or instructions for receiving the second voltage at the second power management circuit, where the third voltage may be based on the second voltage.

Some examples of the method 600 and the apparatus described herein may further include operations, features, means, or instructions for providing the second voltage to the second memory die, the second voltage for operating the second memory die, and providing the third voltage to the first memory die.

Some examples of the method 600 and the apparatus described herein may further include operations, features, means, or instructions for providing, by a third power management circuit on a third memory die, a fourth voltage for operating the third memory die and at least one of the first memory die and the second memory die.

Some examples of the method 600 and the apparatus described herein may further include operations, features, means, or instructions for receiving the second voltage and the third voltage at the third memory die, and operating the third memory die based on the second voltage and the third voltage.

Some examples of the method 600 and the apparatus described herein may further include operations, features, means, or instructions for receiving the first voltage at the third power management circuit, where the fourth voltage may be based on the first voltage.

Some examples of the method 600 and the apparatus described herein may further include operations, features, means, or instructions for receiving the third voltage at the third power management circuit, where the fourth voltage may be based on the third voltage.

Some examples of the method 600 and the apparatus described herein may further include operations, features, means, or instructions for providing the second voltage to a set of memory dies, the second voltage for operating the set of memory dies, and providing the third voltage to the set of memory dies, the third voltage for operating the set of memory dies.

In some examples of the method 600 and the apparatus described herein, providing the second voltage may include operations, features, means, or instructions for regulating the first voltage from a first level to second level, and where providing the third voltage includes, and regulating the second voltage from the second level to a third level.

In some examples of the method 600 and the apparatus described herein, the second voltage may be lower than the first voltage, and where the third voltage may be lower than the second voltage.

It should be noted that the methods described herein describe possible implementations, and that the operations and the steps may be rearranged or otherwise modified and that other implementations are possible. Further, portions from two or more of the methods may be combined.

An apparatus is described. The apparatus may include a conductive line configured to convey current at a first voltage for powering one or more components, a first memory die coupled with the conductive line and including a first power management circuit configured to provide a second voltage for operating the first memory die based on the first voltage, and a second memory die coupled with the first memory die and including a second power management circuit configured to provide a third voltage for operating the first memory die and the second memory die.

In some examples, the second memory die may be configured to receive the second voltage from the first power management circuit, and where the second voltage may be for operating the second memory die. In some examples, the second power management circuit may be coupled with the conductive line, and the third voltage may be based on the first voltage.

In some examples, the second power management circuit may be isolated from the conductive line and coupled with the first power management circuit, and the third voltage may be based on the second voltage provided by the first power management circuit.

Some examples of the apparatus may include a third memory die including a third power management circuit configured to provide a fourth voltage for operating the third memory die and at least one of the first memory die and the second memory die.

In some examples, the third memory die may be configured to receive the second voltage from the first power management circuit, the second voltage for operating the third memory die, and the third memory die may be configured to receive the third voltage from the second power management circuit, the third voltage for operating the third memory die.

In some examples, the third power management circuit may be coupled with the conductive line and the fourth voltage may be based on the first voltage. In some examples, the third power management circuit may be coupled with the second power management circuit and the fourth voltage may be based on the third voltage.

Some examples of the apparatus may include a set of memory dies coupled with the first power management circuit and the second power management circuit, where the second voltage and the third voltage may be for operating the set of memory dies.

Some examples of the apparatus may include a third power management circuit coupled with the conductive line and configured to provide the first voltage.

An apparatus is described. The apparatus may include a first memory die including a first power management circuit, a second memory die including a second power management circuit, and a controller coupled with the first memory die and the second memory die, the controller operable to cause the apparatus to: receive, at the first power management circuit on the first memory die, a first voltage for powering one or more components of the apparatus; provide, by the first power management circuit, a second voltage for operating the first memory die and the second memory die based on the first voltage; and provide, by the second power management circuit on the second memory die, a third voltage for operating the first memory die and the second memory die.

Some examples may further include receiving the first voltage at the second power management circuit, where the third voltage may be based on the first voltage.

Some examples may further include receiving the second voltage at the second power management circuit, where the third voltage may be based on the second voltage.

Some examples may further include providing the second voltage to the second memory die, the second voltage for operating the second memory die, and providing the third voltage to the first memory die.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   generating, by a first power management circuit on a first memory die, a first operating voltage;
   generating, by a second power management circuit on a second memory die, a second operating voltage; and
   providing to a third memory die the first operating voltage from the first memory die and the second operating voltage from the second memory die.

2. The method of claim 1, further comprising:
   providing the first operating voltage to the second memory die, wherein the second operating voltage is generated based at least in part on the first operating voltage.

3. The method of claim 2, further comprising:
   receiving, at the second memory die, a third operating voltage from the third memory die, wherein the third operating voltage is based at least in part on the second operating voltage.

4. The method of claim 1, further comprising:
   generating, by the third memory die, a third operating voltage based at least in part on the first operating voltage; and
   providing the third operating voltage to the first memory die and the second memory die.

5. The method of claim 4, further comprising:
   operating the third memory die using the first operating voltage, the second operating voltage, and the third operating voltage.

6. The method of claim 1, further comprising:
   receiving, by the first memory die, a supply voltage from a power management circuit, wherein the first operating voltage is generated based at least in part on the supply voltage.

7. A method, comprising:
   receiving, at a third memory die from a first power management circuit on a first memory die, a first operating voltage;
   receiving, at the third memory die from a second power management circuit on a second memory die, a second operating voltage; and
   operating the third memory die using the first operating voltage and the second operating voltage.

8. The method of claim 7, further comprising:
   providing the first operating voltage from the first memory die to the second memory die, wherein the second operating voltage is based at least in part on the first operating voltage.

9. The method of claim 7, further comprising:
   generating, by the third memory die, a third operating voltage that is based at least in part on the first operating voltage or the second operating voltage; and
   operating the third memory die using the third operating voltage.

10. The method of claim 9, further comprising:
    providing the third operating voltage to the first memory die and the second memory die.

11. The method of claim 9, further comprising:
    providing the third operating voltage to a set of memory dies in a same package as the third memory die.

12. The method of claim 9, wherein the third operating voltage is lower than the second operating voltage.

13. The method of claim 7, further comprising:
    receiving a supply voltage from a power management circuit; and
    generating a third operating voltage based at least in part on the supply voltage, wherein the third operating voltage is lower than the supply voltage and higher than the first operating voltage and the second operating voltage.

14. The method of claim 13, wherein the second operating voltage is generated based at least in part on the third operating voltage.

15. An apparatus, comprising:
    a set of memory dies include a first memory die, a second memory die, and third memory die; and
    a controller coupled with the set of memory dies and configured to cause the set of memory dies to:
    receive, at the third memory die from a first power management circuit on the first memory die, a first operating voltage;
    receive, at the third memory die from a second power management circuit on the second memory die, a second operating voltage; and
    operating the third memory die using the first operating voltage and the second operating voltage.

16. The apparatus of claim 15, wherein the controller is further configured to cause the set of memory dies to:
    provide the first operating voltage from the first memory die to the second memory die, wherein the second operating voltage is based at least in part on the first operating voltage.

17. The apparatus of claim 15, wherein the controller is further configured to cause the set of memory dies to:
- generate, by the third memory die, a third operating voltage that is based at least in part on the first operating voltage or the second operating voltage; and
- operate the third memory die using the third operating voltage.

18. The apparatus of claim 17, wherein the controller is further configured to cause the set of memory dies to:
- provide the third operating voltage to the first memory die and the second memory die.

19. The apparatus of claim 17, wherein the controller is further configured to cause the set of memory dies to:
- provide the third operating voltage to a set of memory dies in a same package as the third memory die.

20. The apparatus of claim 15, wherein the controller is further configured to cause the set of memory dies to:
- receive a supply voltage from a power management circuit; and
- generate a third operating voltage based at least in part on the supply voltage, wherein the third operating voltage is lower than the supply voltage and higher than the first operating voltage and the second operating voltage.

* * * * *